Feb. 17, 1959   R. A. FISCHER   2,873,661
CABIN PRESSURE CONTROL MECHANISM
Filed Feb. 5, 1954
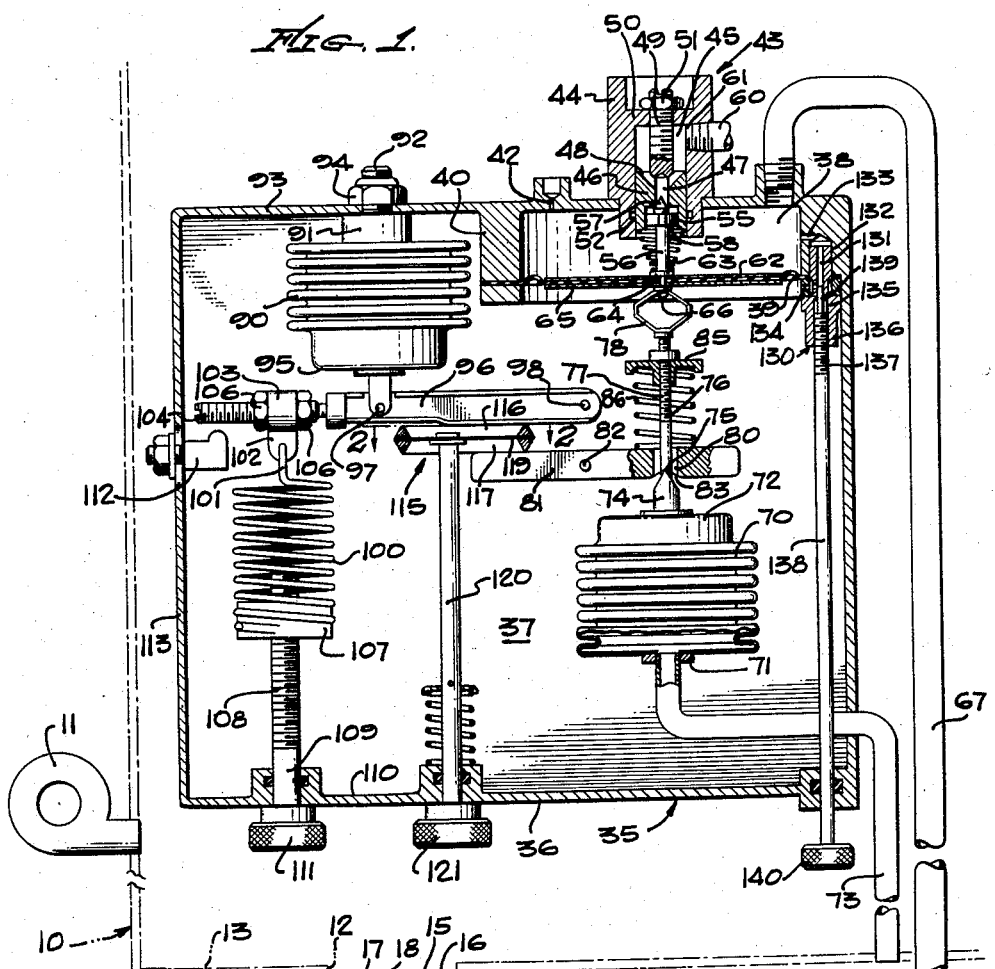
RICHARD A. FISCHER,
INVENTOR.
BY
ATTORNEY United States Patent Office 2,873,661
Patented Feb. 17, 1959

2,873,661

CABIN PRESSURE CONTROL MECHANISM

Richard A. Fischer, Los Angeles, Calif., assignor to The Garrett Corporation, Los Angeles, Calif., a corporation of California Application February 5, 1954, Serial No. 408,355

18 Claims. (Cl. 98—1.5)

This invention relates generally to pressure control mechanism, and relates more particularly to a mechanism of this character for controlling the pressure within an enclosure, such as an aircraft cabin.

While the invention has particular utility in connection with pressurized ventilation of aircraft cabins and the like and is shown and described embodied in such an installation, it is to be understood that its utility is not confined thereto.

When the term "aircraft" is used herein, it is to be understood that it is intended to include any device which passes through the earth's atmosphere or even above.

In some installations, it is highly desirable to so control the pressure within an aircraft cabin that said pressure will be substantially the same as the ambient atmospheric pressure at the destination airport when the aircraft reaches said airport, and to so control the pressure within the cabin during the flight that the occupants thereof will not be subjected to discomforting pressure changes.

It is, therefore, an object of the invention to provide mechanism for controlling the pressure within an aircraft enclosure which will automatically control said enclosure pressure to effect the foregoing described results.

It is another object of the invention to provide mechanism of this character adapted to maintain the pressure within the cabin at a maximum with respect to aircraft flight altitude.

It is still another object of the invention to provide mechanism of this character adapted to maintain the pressure rate of change within the cabin at a minimum with respect to the rate of change of aircraft flight altitude so that when the aircraft arrives at the maximum flight altitude, the cabin pressure will automatically be at the maximum.

It is a further object of the invention to provide mechanism of this character adapted to control the rate of change within the aircraft cabin at or below a rate.

It is a still further object of the invention to provide mechanism of this character adapted to maintain a maximum differential of cabin pressure over atmospheric pressure.

Another object of the invention is to provide mechanism of this character having adjustable means for setting the starting pressure and destination pressure and for setting the maximum flight altitude pressure.

Still another object of the invention is to provide a novel mechanism for varying the fulcrum between certain of the pressure responsive means or devices.

A further object of the invention is to provide mechanism of this character which is pneumatic in operation.

Further objects of the invention are to provide a mechanism of this character that is relatively simple and compact in construction, reliable in operation and is a self-contained unit.

Other objects and advantages of the invention will appear from the following part of the specification.

Referring to the drawings, which are for illustrative purposes only,

Fig. 1 is a schematic sectional view of the pressure control mechanism embodying the invention;

Fig. 2 is a sectional view taken on line 2—2 of Fig. 1; and

Fig. 3 is a graph of a typical flight with the aircraft flight and cabin pressures plotted against time.

Referring more particularly to the drawing, there is shown an enclosure or cabin which is indicated generally at 10, supplied by air under pressure by a suitable pump or supercharger 11 operated by any suitable source of power, not shown, for maintaining a flow of air through the cabin, for purposes of ventilation. The cabin is provided with an outlet opening 12, in a wall 13 thereof, said outlet being controlled by an outflow valve, indicated generally at 14 in Fig. 1. The outflow valve 14 constitutes a means for regulating the pressure in the cabin to a value which corresponds to the pressure selected by the control point setting mechanism and is an example of one type of outflow valve which may be used in connection with the control mechanism which will be hereinafter described. Other types of outflow valves may be used, another example being that disclosed in the patent to Kemper No. 2,463,491.

The valve 14 will be but briefly described herein, inasmuch as a valve of this type is fully shown and described in the Arthur et al. Patent No. 2,531,100.

This valve comprises an outwardly opening balanced valve member 15 in the general shape of a shallow cup, said valve member having a peripheral flange 16 having a thin or narrow edge engageable with a seat 17 attached to the cabin wall and having an opening 18 which registers with the opening 12. An annular member 19, generally Z-shaped in cross section, is supported in spaced relation to the valve seat by means of spacers 20 through which bolts, not shown, pass.

The member 19 includes an outwardly extending annular flange 21 secured by the above referred-to bolts. The Z-shaped member 19 also includes an annular inturned flange 22 to which one end of a flexible diaphragm 23 is secured. The other end of the diaphragm is connected to the valve member 15 by means of an annular collar 24. The diaphragm includes a generally U-shaped portion 25 in the space between the member 19 and the collar 24, said U-shaped portion 25 rolling as the valve member 15 moves axially. A generally cup-shaped cover 26 is attached to the flange 21 and defines, with the member 19, diaphragm 23 and valve member 15, a pressure chamber 27.

The valve 15 is adapted for axial movement and is provided with a stem 28 suitably mounted in a guide 29. A light spring 30, which reacts between the valve member 15 and a collar 31 on the guide 29, urges the valve member 15 in the closing direction.

By gradually changing the pressure in the pressure chamber 27 by means of the control point setting mechanism, the cabin pressure will be changed from one pressure altitude to another. The rate at which the cabin pressure will be changed from one value to another is determined by the setting of the control mechanism.

The mechanism for setting the pressure in the chamber 27 is indicated generally at 35 and comprises a housing 36. The mechanism 35 includes a pressure chamber 37 and a pressure chamber 38, the chamber 37 being defined by a portion of the housing 36 and a flexible diaphragm 39 which separates said chambers 37 and 38. Diaphragm 39 is thus a differential pressure responsive element and is part of a pressure differential regulating mechanism for controlling the differential in pressure between the chambers 38 and 37 when in the process of controlling rate of change. The chamber 38 is defined by said diaphragm 39, and an annular wall 40, as well as by a portion of the housing 36.

Air is bled into the chamber 38 from a source of higher pressure, which is shown as the cabin interior, through a restricted calibrated bleed 42, and escape of air to a region of lower pressure (which may be ambient atmosphere) is controlled by a valve, indicated generally at 43.

The valve 43 comprises a valve cage 44 having a bore 45 therein, for slidable reception of an adjustable valve seat 46. The seat 46 has a central passage 47 therein, and branch passages 48 terminating outwardly of a screw 49 formed integrally with the seat 46. The screw extends axially of said seat and is threadably received in an opening in an end wall 50 of the cage 44. Rotation of the screw 49 effects adjustment of the seat 46, and a lock nut 51 on said screw locks it in adjusted positions. A seal 52 is received in an internal groove provided therefor in the cage 44, and prevents leakage of air past the adjustable valve seat.

The axial bore in the valve seat has an enlarged portion 55 at the inner end which serves as a guide for a valve member comprising a stem 56, a conical seat engaging portion 57 and an enlarged portion 58 adjacent the portion 57, said portion 58 being profiled to provide passages so that air may flow from the chamber 38 past the valve and into the upper end of the bore 45, as shown in the drawing, from whence the air may pass to a region of low pressure such as atmosphere, through a tube 60, threadably secured in a threaded opening 61 provided therefor in the wall of the cage 44.

The lower or inner end of the valve stem 56 is urged into abutment with a reenforcing plate 62 on the side of the diaphragm exposed to the pressure in the chamber 38 by means of a light spring 63 which reacts between the inner end of the adjustable seat member 46 and an enlarged head 64 at the lower end of the valve stem 56.

Opposite the reenforcing plate 62 is a reenforcing plate 65, a central region of the diaphragm 39 being clamped between said plates 62 and 65 which are secured together by a rivet 66 or any other suitable well-known means.

The chamber 38 is connected with the chamber 27 of the outflow valve 14 by means of a conduit 67. Thus, the pressure in the chamber 27 will be substantially the same as the pressure in the chamber 38, said pressure being termed the control point setting pressure and the chamber 38 being termed the control chamber.

The chamber 37 is termed herein the back-up chamber for purposes of convenient reference.

Within the backup chamber 37, there is a differential pressure responsive device shown as a bellows 70 having one end, 71, fixed and the opposite end 72 movable. The interior of the bellows 70 is connected with ambient atmosphere by means of a conduit 73 so that said bellows is responsive to variations in the differential of pressure between that in the chamber 37 and ambient atmosphere. The end 72 of the bellows is provided with a stem 74 tapering to a fulcrum edge 75. From the end of the stem 74 having the edge 75 there extends an integral reduced diameter extension 76 having the upper end portion 77 threaded. The extension 76 is connected at its upper end with a link spring 78 which is shown as being generally diamond-shaped and is connected with the diaphragm 39 by means of the rivet 66.

Extension 76 extends through an opening 80 in a lever 81 which is pivoted at 82 intermediate its ends. The opening 80 is at one side of the pivot 82 and the underside of the lever at the sides of the opening 80 are tapered inwardly, as at 83, to provide a bearing for the fulcrum edge 75. There is also a yielding connection between the extension 76 and the end of the lever having the opening 80 and said connection includes a spring retainer 85 threaded onto the portion 77 of the extension 76, and the spring 86 which reacts between said spring retainer 85 and the end of the lever through which extension 76 extends.

Backup chamber 37 is also provided with an absolute pressure device shown as an evacuated bellows 90 having a boss 91 at one end which terminates in a screw portion 92 received in an opening provided therefor in the top wall 93 of the housing 36. Screw portion 92 is provided with a nut 94 for anchoring bellows 90 to said wall 93. The opposite end 95 of bellows 90 is operably connected to a lever 96 by means of a pivot 97 adjacent one end of said lever 96. The opposite end of lever 96 is pivoted on a pivot 98 which is spaced upwardly of the pivot 82 of lever 81. Means for variably loading the bellows 90 is provided and includes a spring 100 having one end 101 connected to an ear 102 of a sleeve 103 movable longitudinally on a screw 104 secured to and extending from the end of the lever 96 adjacent the pivot 97. Sleeve 103 is adjustable on screw 104 by means of nuts 106 at opposite ends thereof and said nuts also provide means for locking the sleeve in adjusted positions. The opposite end of spring 100 is connected to a nut 107 having a tapped opening therein for threaded reception of the threaded end 108 of an adjusting screw 109 which extends through the adjacent wall 110 of the housing 36 and is provided with an adjusting knob 111.

Means for limiting counterclockwise movement of lever 96 is provided and comprises a fixed stop 112 secured to wall 113 of the housing 36, stop 112 being engageable by the screw 104 under conditions which will be more particularly described hereinafter. A stop may be placed within the bellows 90 to limit clockwise movement of the lever 96.

Levers 81 and 96 are spaced apart from each other but are connected by fulcrum means, indicated generally at 115, which comprise upper and lower annular rings 116 and 117 respectively.

Each of the rings 116 and 117 is shown as being triangular in cross section and the bases of the rings are facing each other. A diaphragm 119 is secured between the rings 116 and 117 and said diaphragm is eccentrically secured to a flight altitude adjusting shaft 120. Rod 120 extends outwardly of the housing 36 through an opening provided therefor in wall 110 and there is a flight altitude setting knob 121 secured to the outwardly extending end of said rod.

A portion of the rings 116 and 117 extends between levers 81 and 96 and the apex of ring 117 is engaged by the lever 81 adjacent the end opposite the end having the engagement with the bellows 70. It is to be noted that the engagement of lever 96 with the ring 116 is between the pivot 98 and the point of connection between the bellows 90 and said lever 96; while the engagement of lever 81 with ring 117 is at a point on the opposite side of the pivot 82 from the side engaged by the pin 74 of bellows 70. It will be noted that by rotating the shaft or rod 120, the fulcrum connection between the levers 81 and 96 will be varied longitudinally with respect to said levers.

A rate selector valve, indicated generally at 130, has an orifice, including a passage 131, in a plug 132, and lateral passages 133 and 134 connecting said passage 131 with the chambers 38 and 37 respectively. The passage 131 is enlarged at 135, the enlarged part 135 of said passage extending within the valve fixture 136 and said passage 133 is internally threaded for reception of the externally threaded portion 137 of an adjusting rod 138. The threaded end of the rod 138 is provided with a reduced diameter tip 139 slidably received in the bore 131 and adapted to adjustably restrict the cross passage 134, thereby adjustably restricting the fluid connection between chamber 37 and chamber 38. The outer end of rod 138 extends outwardly of the housing 36 through an opening provided therefor in wall 110 and said rod 138 is provided with an adjusting knob 140.

Operation of the mechanism

Assuming that the aircraft is on the ground, the condition of the mechanism is as follows:

Ambient atmospheric pressure will exist in chamber 38 and in the back up chamber 37 since it is connected to the chamber 38 through the rate selector valve 130. Due to this pressure in back up chamber 37, the evacuated bellows 90 is compressed so that it applies no load on the variable lever arm 96. Therefore, there is no load applied by said bellows 90 to the left end (as shown in the drawings) of the lever 81, and the metering valve 56 is urged into a fully open position by means of the spring 63, the linkage intermediate the valve 43 and the bellows 70 being in a floating condition.

Before taking off, the device is set with respect to the starting altitude and the contemplated maximum flight altitude. In setting the device with respect to the starting altitude, the knob 111 is adjusted. Adjustment of knob 111 turns the screw 108 and thereby adjusts the tension of the spring 100 to the desired value. This tension acts to urge the variable lever arm 96 in a counterclockwise direction so that the free end thereof is urged toward the evacuated bellows stop 112 and thus establishes the pressure at which the operation of the control is to commence which is usually the pressure at the starting airport. However, the setting may be such as to follow a schedule wherein the operation of the control begins at an altitude higher than that of said starting airport.

For the ratio control, the evacuated bellows 90 cooperates with the differential pressure bellows 70 through the lever arm 96, fulcrum member 115 and the lever 81. The ratio control is provided between the starting point of the aircraft and the predetermined differential pressure at which the differential control is set to take over.

Due to the particular connection between the lever 81 and the differential pressure responsive bellows 70, the differential pressure between that in the back up chamber and atmosphere will affect the control that would normally be maintained by the evacuated bellows 90 so that as the aircraft ascends, a change in the differential across the bellows 70 will apply a varying load, opposing the force of the evacuated bellows 90 that is tending to close the valve 43. As the aircraft continues to ascend, this load, as applied by the bellows 90 steadily increases until the force of the differential spring 86 is overcome and the variable lever arm 96 engages the stop 112 thus rendering the evacuated bellows 90 inoperative. Thereafter, the pressure in the control chamber 38 and, hence, in the enclosure will be under full control of the differential bellows 70 which then operates to control the escape of air from the control chamber 38.

The ratio setting is determined by the position of the fulcrum points on levers 81 and 96. In setting the device relative to the maximum flight altitude, rotation of knob 121 effects rotation of the adjusting rod 120, and this, in turn, rotates the fulcrum member 115 to vary the point beneath the lever 96 of the portion of said fulcrum member which serves as the operative connection between said lever 96 and lever 81. The point of contact of the fulcrum member with lever 96 is intermediate the fixed pivot 98 and the point of attachment 97 of the bellows 90 with said lever 96. The position of the fulcrum member 115 serves to determine the lever arm ratio or the proportioning of the load of the evacuated bellows 90 relative to the load of the differential bellows 70 and the bellows spring 86. This proportioning of said loads serves to determine the ratio between the control pressure chamber and ambient pressure and, hence, cabin pressure and ambient pressure, up to the altitude at which the maximum differential control chamber pressure and, hence, cabin pressure, is reached as determined by the spring 86.

Once the settings have been made, the mechanism is ready for complete automatic control of the pressure in the cabin or enclosure. When the aircraft takes off and starts to gain altitude, a drop occurs in the ambient atmospheric pressure which is transmitted to the control chamber 38 through the open needle valve 57. A drop in pressure also occurs in the chamber 37 by reason of the bleeding of air from said chamber through the valve 134 and into chamber 38. The evacuated bellows 90 therefore expands and loads the differential bellows 70 through the lever 96, fulcrum member 115, lever 81 and spring 86. The expansion of the bellows 90 is exerted as a downward force on lever 96 which is transmitted through the fulcrum 115 to the adjacent end of the lever 81 which effects a counterclockwise movement of the latter so that the righthand end of said lever 81 moves upwardly and, through the spring 86, urges the metering pin 56 of the valve 43 toward closing position. As the aircraft continues to ascend, the pressure within chamber 37 continues to fall and the force of the spring 100 acting against the force of the evacuated bellows 90 increases the loading on the bellows 70 maintaining the valve pin 56 in a metering position until the fixed compression of the differential spring 86 is overcome. Thereupon the free end of lever 96 engages the stop 112 to render the bellows 90 inoperative. The compression in the differential spring 86 is fixed so that when its force is completely overcome, the differential control begins to operate.

The function of this control mechanism will be better understood with a reference to Fig. 3. With the horizontal coordinate representing time, the slope of the line A—B representing the rate of change in aircraft flight pressure altitude and the slope of the line A—C representing the rate of change in cabin pressure altitude, the ratio between the slopes of line A—B and A—C is the maximum allowable in keeping with the differential setting so that upon arrival at points B and C, the maximum pressurization will be provided. Further, when the differential pressure control takes over, the aircraft is at the maximum flight altitude, indicated by the point B, while the control chamber, and hence the cabin, is at the maximum differential pressure altitude, preselected or set for that particular flight as indicated by the point C.

The operation of the differential pressure control mechanism is as follows: the pressure within the chamber 37 acts upon the outside of the differential bellows 70 and is opposed by the ambient atmospheric pressure existing within said bellows, said ambient atmospheric pressure being transmitted to the interior of bellows 70 by the conduit 73. Changes in the differential pressure across bellows 70 act to cause movement thereof directly to the extension 76 of the stem 74 and the spring 78 to thereby position the metering pin 56 so as to control the escape of air from the control chamber 38 to atmosphere by way of the conduit 60.

Should it be desired to return the aircraft to the starting airport or to a destination airport which is at the same altitude as the starting airport, complete automatic operation is continued during the descent and the schedule of change in cabin pressure is again controlled at a ratio between the rate of change between the aircraft flight altitude pressure and the rate of control chamber pressure, and hence of cabin pressure, until the aircraft lands. If, however, the aircraft is to land at an airport at a different altitude, the mechanism may be suitably reset by adjustment of the knob 111, the rate of change in the control chamber pressure, and hence in cabin pressure, then being automatically maintained during descent in accordance with the new ratio setting.

There is also provided a rate of change control for limiting the change in pressure in the control chamber and, hence, in the cabin to a predetermined maximum. This rate of change mechanism will take over the control of the pressure change in the chamber 38, and hence in the cabin, in the event of a too-rapid change in pressure therein. For example, should the ratio control be set so as to maintain control chamber pressure, and hence cabin pressure, at, say, one-half the rate of change in the aircraft flight altitude, the rate of change in the latter may be so rapid that one-half of said change will be more than the maximum set rate and the rate of change control mechanism will override the ratio control.

The desired maximum rate of change of pressure altitude may be set by adjusting the rate selector knob 140 to fix the size of the orifice of the rate setting valve 130, said adjustment of the rate selector knob positioning the pin or tip 139. When the airplane takes off from the landing field and altitude is gained, a drop occurs in the ambient atmospheric pressure which is transmitted to the control chamber 38 through the open needle valve 57. Should the set rate be exceeded, the pressure in the chamber 38 will drop below the pressure existing in the chamber 37 and a pressure differential will be set up across the orifice of the valve 130 as well as across the diaphragm 39. This will cause the diaphragm to move in a direction against the force of the spring 78 to move the valve 43 in the closing direction. There will then be an inter-action between the forces acting on the diaphragm 39 and the action of the spring 78 which will result in positioning the metering valve portion 57 so as to limit to a maximum the pressure differential across the orifice of the valve 130.

Except for sudden surges, there is very little movement of the parts but there is a continual application of forces between them.

It will be understood that by thus limiting to a maximum the pressure differential across the orifice of the valve 130, the maximum rate of change in pressure in the back-up chamber 37 is essentially determined (neglecting the density change) and, consequently, the maximum rate of change in pressure in the control chamber 40 and the pressure in the pressure chamber 27 behind the sensing valve 15 of the cabin outflow valve unit 14 is also determined.

The present mechanism will also provide another type of control. For example, let it be assumed that the aircraft has ascended at a very rapid rate and that, in keeping with the automatic operation of the device as explained hereinabove, the rate of change control mechanism has operated during this time. A condition might then arise where the aircraft would reach an altitude which would otherwise cause the maximum differential between ambient pressure and the control chamber pressure, and hence cabin pressure, to be exceeded. In this event, the differential control takes over earlier than it normally would and automatically overrides all other controls to assure that the maximum pressurization allowable by the aircraft structure will not be exceeded.

It will, therefore, be apparent that the safe maximum differential between the pressure in the aircraft and ambient atmospheric pressure will not be exceeded even though the aircraft may exceed the set flight altitude.

I claim:

1. In pressure control mechanism: means defining a pair of chambers, one of said chambers being a control pressure chamber having an inlet passage and an outlet passage; means, including a valve for controlling one of said passages; differential pressure responsive means for controlling said valve, said differential pressure responsive means having one side subjected to the pressure in the control pressure chamber and the opposite side subjected to the pressure in the other chamber; means defining a restricted connection between said chambers; and ratio control means for controlling said valve, said ratio control means comprising an absolute pressure responsive device subjected to pressure in said other chamber, a differential pressure responsive device having one side subjected to the pressure in said other chamber and having its opposite side subjected to ambient atmospheric pressure; and means, including lever means, interconnecting said absolute pressure responsive device and said differential pressure responsive device.

2. In pressure control mechanism: means defining a pair of chambers, one of said chambers being a control pressure chamber; means for controlling the flow of fluid relative to said control pressure chamber, said means including differential pressure responsive means responsive to variations in the differential of pressure between said chambers; and ratio control means for controlling the flow of fluid relative to said control pressure chamber, said ratio control means including an absolute pressure responsive device subjected to the pressure in the other of said chambers, a differential pressure responsive device subjected on one side to the pressure in said other chamber and subjected on the opposite side to ambient atmospheric pressure, and a pair of levers interconnecting said devices.

3. The invention defined by claim 2 including means for varying the ratio relationship between said levers.

4. The invention defined by claim 2 including fulcrum means interposed between said levers and movable longitudinally thereof to vary the ratio relationship therebetween.

5. Pressure control mechanism: means defining a pair of chambers, one of said chambers being a control pressure chamber having an inlet passage and an outlet passage; means, including a valve for controlling one of said passages; differential pressure responsive means for controlling said valve, said differential pressure responsive means having one side subjected to the pressure in the control pressure chamber and the opposite side subjected to the pressure in the other chamber; means defining a restricted connection between said chambers; and ratio control means for controlling said valve, said ratio control means comprising an absolute pressure responsive device subjected to pressure in said other chamber, a differential pressure responsive device having one side subjected to the pressure in said other chamber and having its opposite side subjected to ambient atmospheric pressure; and means interconnecting the absolute pressure responsive device and said differential pressure responsive device, said means including means for variably loading the differential pressure responsive device by said absolute pressure responsive device.

6. In pressure control mechanism: means defining a pair of chambers, one of said chambers being a control pressure chamber having an inlet passage and an outlet passage; means, including a valve for controlling one of said passages; differential pressure responsive means for controlling said valve, said differential pressure responsive means having one side subjected to the pressure in the control pressure chamber and the opposite side subjected to the pressure in the other chamber; means defining a restricted connection between said chambers; ratio control means for controlling said valve, said ratio control means comprising an absolute pressure responsive device subjected to pressure in said other chamber; a differential pressure responsive device having one side subjected to the pressure in said other chamber and having its opposite side subjected to ambient atmospheric pressure; yielding means connected with said differential pressure responsive device for loading same; and means connecting the absolute pressure responsive device with said yielding means whereby to vary the loading effect thereof on said differential pressure responsive device.

7. The invention defined by claim 6 including stop means for the absolute pressure responsive device for limiting movement thereof in either direction for effecting loading of said yielding means.

8. In pressure control mechanism for enclosures: means defining a pair of chambers, one of said chambers being a control pressure chamber; means controlling the pressure in the control pressure chamber, said means including ratio control means comprising an absolute pressure responsive device responsive to the pressure in the other of said chambers and a differential pressure responsive device responsive to variations in the differential of pressure between that in said other chamber and ambient atmosphere; means for limiting the rate of pressure change in the control pressure chamber, said means being adapted to override the ratio control means.

9. The invention defined by claim 8 including means for limiting the movement of the absolute pressure responsive means so as to render same inoperative under predetermined operating conditions.

10. The invention defined by claim 8 wherein the differential pressure responsive device is operably connected with the absolute pressure responsive device under certain operating conditions and under other predetermined operating conditions is movable relative to said absolute pressure responsive device.

11. In mechanism for controlling the pressure in an enclosure: means defining a pair of chambers, one of said chambers being a control pressure chamber; means controlling the flow of fluid relative to said chamber, said means including a pilot valve and pressure responsive element responsive to variations in the differential of pressure in said chambers for controlling said pilot valve; means defining a restricted passage between said chambers; and ratio control means for controlling the flow of fluid relative to said control pressure chamber, said ratio control means including an absolute pressure responsive device subjected to the pressure in the other of said chambers, a differential pressure responsive device responsive to variations in the differential of pressure between that in said other chamber and ambient atmosphere; means providing a resilient connection between the differential pressure responsive device and said pilot valve, resilient means for loading the differential pressure responsive device and leverage means connecting the absolute pressure responsive device with said loading means.

12. The invention defined by claim 11 including adjusting means for varying the response characteristics of the absolute pressure responsive device; and means interposed in said leverage means for varying the ratio between parts of said leverage means.

13. The invention defined by claim 11 including an outflow valve for the enclosure, said outflow valve having an operating pressure chamber, means connecting the operating pressure chamber with said control pressure chamber; and a movable pressure sensitive control element subjected on one side to said operating pressure for controlling the outflow of fluid from said enclosure.

14. In ratio control means: an absolute pressure responsive device; a differential pressure responsive device; a lever pivoted intermediate its ends, the differential pressure responsive device having a one-way connection with one of said ends; a spring connecting said lever end with said differential pressure responsive device; a scond lever pivoted adjacent one end and having the connection with the absolute pressure responsive device, a portion of said second lever having a part lying substantially parallel with the other end of the first mentioned lever and spaced therefrom; and fulcrum means between said part of the second mentioned lever and said other end of the first mentioned lever.

15. The invention defined by claim 14 wherein said fulcrum means is adjustable longitudinally with respect to said levers.

16. In pressure control mechanism: means defining a pair of chambers, one of said chambers being a control pressure chamber; means for controlling the flow of fluid relative to said control pressure chamber, said means including differential pressure responsive means responsive to variations in the differential of pressure between said chambers; and ratio control means for controlling the flow of fluid relative to said control pressure chamber, said ratio control means including a pair of cooperating pressure responsive means subjected on one side to the pressure in the other of said chambers, the other side of one of said pair of pressure responsive means being subjected to external pressure.

17. In pressure control mechanism: means defining a pair of chambers, one of said chambers being a control pressure chamber; and means for controlling the flow of fluid relative to said control pressure chamber, said means including ratio control means comprising an absolute pressure responsive device subjected to the pressure in the other of said chambers, a differential pressure responsive device subjected on one side to the pressure in said other chamber and subjected on the opposite side to ambient atmospheric pressure, and a pair of levers interconnecting said devices.

18. In pressure control mechanism: means defining a pair of chambers, one of said chambers being a control pressure chamber having an inlet passage and an outlet passage; means, including a valve for controlling one of said passages; differential pressure responsive means for controlling said valve, said differential pressure responsive means having one side subjected to the pressure in the control pressure chamber and the opposite side subjected to the pressure in the other chamber; means defining a restricted connection between said chambers; and ratio control means for controlling said valve, said ratio control means comprising an absolute pressure responsive device subjected to pressure in said other chamber, a differential pressure responsive device having one side subjected to the pressure in said other chamber and having its opposite side subjected to ambient atmospheric pressure; and means interconnecting said absolute pressure responsive device and said differential pressure responsive device.

References Cited in the file of this patent

UNITED STATES PATENTS

| Number | Name | Date |
|---|---|---|
| 2,391,197 | Schwien | Dec. 18, 1945 |
| 2,463,487 | Widgery et al. | Mar. 1, 1949 |
| 2,510,976 | Herrala et al. | June 13, 1950 |
| 2,513,332 | Kemper | July 4, 1950 |
| 2,549,673 | Del Mar | Apr. 17, 1951 |
| 2,589,597 | Baak | Mar. 18, 1952 |
| 2,602,350 | Marcellus | July 8, 1952 |
| 2,665,624 | Arthur | Jan. 12, 1954 |
| 2,669,129 | Williams | Feb. 16, 1954 |
| 2,669,175 | Fischer | Feb. 16, 1954 |
| 2,749,828 | Kemper et al. | June 12, 1956 |